United States Patent [19]

Briggs et al.

[11] Patent Number: 5,281,443
[45] Date of Patent: Jan. 25, 1994

[54] COATING METHOD FOR ONE-COMPONENT BLOCKED ISOCYANATE-CROSSLINKED CLEARCOAT

[75] Inventors: Rodney L. Briggs, Linden; Michael Knight, Center Line, both of Mich.

[73] Assignee: BASF Corporation, Southfield, Mich.

[21] Appl. No.: 810,991

[22] Filed: Dec. 20, 1991

[51] Int. Cl.$^5$ ............................................... B05D 1/36
[52] U.S. Cl. ................................. 427/407.1; 427/409
[58] Field of Search .................... 427/407, 409, 412.1, 427/388.2

[56] References Cited

U.S. PATENT DOCUMENTS

| | | | |
|---|---|---|---|
| 4,008,293 | 2/1977 | Maska et al. | 427/385.5 |
| 4,220,679 | 9/1980 | Backhouse | 427/409 |
| 4,530,859 | 7/1985 | Grunzinger, Jr. | 427/385.5 |
| 4,681,815 | 7/1987 | Rutkiewic et al. | 427/407.1 |
| 4,755,418 | 7/1988 | DebRoy et al. | 428/215 |
| 4,759,961 | 7/1988 | Kato et al. | 427/407.1 |
| 4,798,745 | 1/1989 | Martz et al. | 427/407.1 |
| 4,798,746 | 1/1989 | Claar et al. | 427/407.1 |
| 5,100,735 | 3/1992 | Chang | 427/407.1 |
| 5,102,692 | 4/1992 | Tanigami et al. | 427/409 |
| 5,137,972 | 8/1992 | Cook | 525/123 |
| 5,182,355 | 1/1993 | Martz | 427/407.1 |
| 5,221,584 | 6/1993 | Nickle et al. | 427/407.1 |
| 5,225,248 | 7/1993 | Stephenson | 427/412.1 |
| 5,238,999 | 8/1993 | Cook et al. | 427/388.2 |

FOREIGN PATENT DOCUMENTS 3918968 12/1989 Fed. Rep. of Germany.
2171030A 8/1986 United Kingdom.

*Primary Examiner*—Shrive Beck
*Assistant Examiner*—Diana Dudash
*Attorney, Agent, or Firm*—Paul L. Marshall

[57] ABSTRACT

A method of coating an article to prevent yellowing of the clearcoat is described. The method comprises the steps of (A) coating at least one layer on an article with a coating composition comprising a cross-linkable polymer and a cross-linking agent, said composition being substantially free of strong acid, (B) coating a clearcoat layer above the layer from step A) with a coating composition comprising
  1) a polymer comprising a hydroxy functional group, and
  2) a blocked isocyanate cross-linking agent, and C) curing the coated article.

10 Claims, No Drawings

COATING METHOD FOR ONE-COMPONENT BLOCKED ISOCYANATE-CROSSLINKED CLEARCOAT

FIELD OF THE INVENTION

This invention relates to polymeric coatings to a method of producing a coating having a clearcoat layer that utilizes a blocked isocyanate crosslinking agent.

BACKGROUND OF THE INVENTION

The most frequently used methods today of producing clearcoats for automotive and other coatings applications involve application of the clearcoat composition over a high-solids basecoat. The basecoat is usually composed of one or more hydroxy-functional polymers and an aminoplast crosslinking agent. Curing of the high-solids basecoat generally requires the presence of a strong acid catalyst (e.g., p-toluenesulfonic acid, dinonylnaphthalenedisulfonic acid, dodecylbenzenesulfonic acid, phenyl acid phosphate).

Clearcoat compositions can be characterized as being of the one-component type or the two-component type. In the two-component or "two-pack" system, the polymer and the cross-linking agent are combined just prior to coating. The two-component system allows for the use of highly reactive cross-linking agents, which can provide advantageous physical properties to the coating. However, the process usually requires mixing of the components in just the right proportion immediately prior to coating, and can be expensive to operate and difficult to control. The one-component or "one-pack" systems offer significant advantages in manufacturability because the cross-linkable clearcoat coating composition can be coated as one formulation. In order to prevent premature cross-linking of the clearcoat composition, the cross-linking agent in one-component systems is usually blocked with a group that unblocks under specified conditions, such as high heat. The most common types of blocked cross-linking agents are aminoplast resins (e.g., melamine formaldehyde resin) and isocyanates (e.g., oxime-blocked toluene diisocyanate). Clearcoats that have been cross-linked with aminoplast cross-linking agents exhibit good clarity and hardness; however, they suffer from a phenomenon known as environmental etch. Environmental etch appears as milky or cloudy marks on clearcoat finishes that have been exposed to the elements. Clearcoats that have been cross-linked with blocked isocyanate cross-linking agents also exhibit good hardness, and they are resistant to environmental etch. However, they suffer from severe yellowing.

It is thus an object of this invention to provide a basecoat-clearcoat coating utilizing a one-component clearcoat that has the environmental etch resistance provided by blocked isocyanate cross-linking agents, but with reduced yellowing.

SUMMARY OF THE INVENTION

It has now been found that the yellowing normally observed in clearcoat layers cross-linked with a blocked isocyanate cross-linking agent can be reduced by keeping the coating composition in the basecoat layer(s) below the clearcoat substantially free of strong acid. Thus, according to the present invention, a coating is prepared by (A) coating at least one layer on an article with a coating composition comprising a cross-linkable polymer and a cross-linking agent, said composition being substantially free of strong acid, (B) coating a clearcoat layer above the layer from step A) with a coating composition comprising
1) a polymer comprising a hydroxy functional group, and
2) a blocked isocyanate cross-linking agent, and C) curing the coated article.

Coatings prepared according to the present invention exhibit good physical properties, such as hardness, scratch resistance, and the like. The coatings are also resistant to the phenomenon known as environmental etch. Furthermore, the coatings exhibit reduced yellowing compared to prior art clearcoats utilizing blocked isocyanate cross-linking agents. The method of the present invention is highly useful for preparing automotive coatings of the basecoat-clearcoat variety, with the layer of step A) being the basecoat and the layer of step B) being the clearcoat.

DESCRIPTION OF THE PREFERRED EMBODIMENTS

The present invention requires that the coating composition of step A) be substantially free of strong acid. What is meant by strong acid is an acid of sufficient strength to provide acid catalysis of a hydroxy-functional acrylic polymer with a fully-alkylated melamine cross-linking agent. Such strong acid catalysts include p-toluenesulfonic acid, dinonylnaphthalene disulfonic acid, dodecylbenzenesulfonic acid, phenyl acid phosphate, and generally have a pKa equal to or less than these acids. In addition to the strong acid catalysts typically used to catalyze melamine crosslinking, other sources of strong acid in polymeric coating compositions can be associated with microgel sag control agents (e.g., from surfactants used in the preparation of such microgels). In a narrower, and more preferred, embodiment of the invention, the coating composition of step A) is not only substantially free of strong acid, but is substantially free of any acid other than acid groups attached to the cross-linkable polymer itself. By "substantially free", it is meant that the level of acid is low enough to produce a noticeable reduction in yellowing of the layer of step B) compared to the yellowing that would occur if there were an amount of strong acid present in the coating composition of step A) sufficient to catalyze the cross-linking of a hydroxy-functional acrylic polymer with a fully-alkylated melamine cross-linking agent (such catalytic amounts generally range from 0.5–2% by weight of vehicle solids). In a preferred embodiment of the invention, there is no strong acid present whatsoever.

The cross-linkable polymer coating composition of step A) according to the present invention may contain any cross-linkable polymer suitable for use in a basecoat, so long as it does not require the presence of a strong acid in order to cure. Polymers known in the art to be useful in basecoat compositions include acrylics, vinyls, polyurethanes, polycarbonates, polyesters, alkyds, and polysiloxanes. Preferred polymers include acrylics.

In order to be cross-linkable (i.e., curable), the polymer comprises one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Preferred cross-linkable functional groups include hydroxy functional groups and amino functional groups.

The cross-linkable polymer to be used in step A) of the present invention may be self-cross-linkable, or it may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates). Examples of aminoplast resins include melamine formaldehyde resins, melamine derivative formaldehyde resins (e.g., benzoguanamine), urea formaldehyde resins, and glycouril resins. Examples of isocyanate compounds include toluene diisocyanate (TDI), tetramethylxylene diisocyanate (TMXDI), and 2,4'- and 4,4'-diphenylmethane diisocyanate (MDI). The preferred cross-linking agents for use in the present invention are polymeric melamine aldehyde resins and polymeric melamine derivative aldehyde resins, and blocked isocyanate cross-linking agents. The polymeric melamines and melamine derivatives are preferred, as they can be utilized more effectively in partially alkylated form than monomeric melamines, which reduces the need for an acid catalyst. Examples of polymeric melamine-type cross-linking agents include Cymel® 325 (available from American Cyanamid), Cymel® 370 (available from American Cyanamid), and Resimene® 881 (available from Monsanto).

The polymer comprising a hydroxy functional group of step B) may include essentially any hydroxy functional polymer, as is well-known in the art. It is preferred that the hydroxy functional polymer is a polymer in which the hydroxy functionality is a primarily hydroxy functionality. Preferably, the primary hydroxy functional polymer is at least one member selected from the group consisting of acrylics, polyesters, epoxies, polycarbonates, polyurethanes, polyamides, polyimides, and polysiloxanes. Such polymers are well-known in the art. More preferably, the hydroxy functional polymer is an acrylic polymer. Hydroxy-functional acrylic monomers that can be used to form such polymers include hydroxyethyl acrylate, hydroxybutyl acrylate, hydroxybutyl methacrylate, hydroxypropyl acrylate, and the like. Other acrylic monomers may also be included in the monomers. Examples of such monomers include methyl acrylate, acrylic acid, methacrylic acid, methyl methacrylate, butyl methacrylate, cyclohexyl methacrylate, and the like.

In general, the hydroxy functional polymer is present in the coating composition of step B) in an amount of from about 10 weight percent to about 50 weight percent, preferably from about 15 weight percent to about 35 weight percent preferably, and more preferably about 25 weight percent. The blocked isocyanate to be utilize in step B) comprises an isocyanate portion and a blocking portion. In making the blocked isocyanate, a compound having an isocyanate group thereon is reacted with blocker compound, as is well-known in the art. The blocker compound reacts with the isocyanate group in a manner that thereafter prohibits the reaction of the isocyanate functionality with a polymeric hydroxy group present in a stable one-component clearcoat formulation. This prohibition is maintained until the blocked isocyanate is subjected to conditions sufficient to deblock the molecule, usually elevated temperatures. Once heated above the deblocking temperature, the blocker portion separates from the isocyanate functionality, thereby allowing the isocyanate functionality to cross-link the polymer via a reaction with the hydroxy functionality.

Compounds suitable as the isocyanate portion of the blocked isocyanate are well-known in the art, and include toluene diisocyanates, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4''-triisocyanate, tetramethyl xylene diisocyanate, metaxylene diisocyanate, and polyisocyanates.

Groups suitable for use as the blocker portion of the blocked isocyanate are also well-known in the art, and include alcohols, lactams, oximes, malonic esters, alkylacetoacetates, triazoles, phenols and amines. Of these, oximes (e.g., acetone oxime, methylethyl ketoxime, methylamyl ketoxime) are preferred.

The blocked isocyanate is preferably present in the composition of step B) in an amount of from about 10 weight percent to about 40 weight percent, and more preferably from about 15 weight percent to about 30 weight percent.

Most preferably, the blocked isocyanate is a mixture of both an isocyanurate of isophorone diisocyanate and an isocyanurate of 1,6-hexamethylene diisocyanate, wherein the blocker portion is an oxime (e.g., acetone oxime, methylethyl ketoxime, methylamyl ketoxime), and wherein the blocked isocyanate is present in an amount of about 25 weight percent, based on the weight of the one-component formulation. Such blocked isocyanate mixtures are described more fully in U.S. patent application 07/752,033, now U.S. Pat. No. 5,137,972.

A solvent may optionally be utilized in the one-component clearcoat formulation used in the process of the present invention. Although the formulation of the present invention may be utilized, for example, in the form of substantially solid powder, or a dispersion, it is often desirable that the formulation used in the present invention is in a substantially liquid state, which can be accomplished with the use of a solvent. This solvent should act as a solvent with respect to both the hydroxy-functional polymer as well as the blocked isocyanate. Preferably the solvent is present in an amount effective to substantially solubilize both the hydroxy-functional polymer and the blocked isocyanate. In general, the solvent can be any organic solvent and/or water. Preferably, the solvent is a polar solvent, as polar solvents may allow the blocking agent to dissociate (i.e. deblock) at lower temperatures. More preferably, the solvent is a polar aliphatic solvents or polar aromatic solvents. Still more preferably, the solvent is a ketone, ester, acetate, aprotic amide, aprotic sulfoxide, aprotic amine, and water. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, and blends of aromatic hydrocarbons.

The solvent may be present in the composition of step B) in an amount of from about 0.01 weight percent to about 99 weight percent, preferably from about 10 weight percent to about 60 weight percent, and more preferably from about 30 weight percent to about 50 weight percent.

The process of the present invention may optionally use a catalyst for the reaction of the blocked isocyanate with the hydroxy functional polymer. Preferably, the catalyst is an organometallic metallic compound or a tertiary amine compound. Examples of useful catalysts include metal acetonyl acetates, quaternary ammonium salts, zinc N-ethyl-N-phenyl dithiocarbamate, pentamethyldiethylenetriamine benzoate, cyclohexylamine acetate, n,n-dimethyl cyclohexylamine acetate, ketimines, N-methyl morpholine, tin octoate, stannic chloride, butyl tin trichloride, dibutyl tin diacetate, dibutyl tin dilaurate, bis(2-ethylhexyl) tin oxide, 1,3-diacetoxy tetrabutyl stannoxate, dibutyl dibutoxy tin, lead naphthenate, bismuth trichloride, bismuth octoate, tetrakis(2-ethylhexyl)titanate, tetrabutoxy titanium, stannous octoate, manganese, zirconium, cobalt, lead, bismuth stannate, lead stannate, zirconium octoate, tin, dibutyl tin maleate, stannous oxalate, stannous stearate, barium nitrate, zinc nitrate, dibutyltin dilauryl mercaptide, bismuth stearate, lead stearate, dimethyltin dichloride, stannous naphthate, dibutyltin bis-O-phenylphenate, dibutyltin S,S-dibutyldithio-carbonate, and triphenylantimony dichloride. Dibutyltin diacetate is a preferred catalyst.

The catalyst may be present in the composition of step B) in an amount of from about 0.01 weight percent to about 10 weight percent, preferably from about 0.1 weight percent to about 2 weight percent, and more preferably about 0.5 weight percent.

The above-described coating compositions can be coated on the article by any of a number of techniques well-known in the art. These include, for example, spray coating, dip coating, roll coating, curtain coating, and the like. For automotive body panels, spray coating is preferred.

After the article is coated with the above-described layers according to the invention, the coated article is subjected to conditions so as to cure the coating layers. Although various methods of curing may be used, heat-curing is preferred, as most of the known blocking groups for the isocyanates used in step B) of the invention unblock upon exposure to heat. Generally, heat curing is effected by exposing the coated article to elevated temperatures provided primarily by radiative heat sources. Curing temperatures will vary depending on the particular blocking groups used in the cross-linking agents, however they generally range between 120° C. and 175° C., and are preferably between 132° C. and 157° C. The curing time will vary depending on the blocking agents, and physical parameters such as the thickness of the layers, however, typical curing times range from 15 to 60 minutes.

The invention is further described in the following example.

EXAMPLE 1

A comparison panel (Panel A) was prepared by spray-coating a primed metal panel with a layer of a white pigmented basecoat coating composition (dry thickness approximately 30 μm) according to the following formulation:

| Component | Parts by weight |
|---|---|
| Cymel ® 303 (fully alkylated monomeric melamine) | 20.14 |
| dodecylbenzene sulfonic acid | 0.94 |
| isobutyl alcohol | 2.34 |
| poly(ethylhexyl acrylate-co-Tone ® M-100-co-styrene-co-butyl methacrylate-co-acrylic acid) (45/45/20/16/3) | 10.10 |
| polybutylacrylate | 0.12 |
| TiO₂ pigment paste* | 44.57 |
| fumed silica pigment paste** | 16.52 |
| inert solvent | 5.21 |

*The 44.57 parts of TiO₂ pigment paste was made up of 11.08 parts of resin solids of poly(ethylhexyl acrylate-co-Tone ® M-100-co-styrene-co-butyl methacrylate-co-acrylic acid), 27.63 parts of TiO₂ solids, and 5.86 parts xylene solvent.

**The 16.52 parts of fumed silica pigment paste was made up of 3.09 parts resin solids of poly(ethylhexyl acrylate-co-Tone ® M-100-co-styrene-co-butyl methacrylate-co-acrylic acid), 11.23 parts fumed silica solids, and 2.20 parts xylene solvent.

The panel was then spray-coated with a layer of a clearcoat coating composition (dry thickness approximately 45 μm) according to the following formulation:

| Component | Parts by weight |
|---|---|
| poly(hydroxyethyl methacrylate-co-ethylhexyl methacrylate-co-cyclohexyl methacrylate-co-ethylhexyl acrylate) (42.2/37.6/19.0/1.2) | 24.95 |
| isocyanurate of isophorone diisocyanate blocked with methylethyl ketoxime | 16.72 |
| isocyanurate of hexamethylene diisocyanate blocked with methylethyl ketoxime | 8.31 |
| dibutyltin diacetate | 0.03 |
| methylisobutyl ketone | 22.74 |
| ethylene glycol butyl ether acetate | 15.20 |
| amyl acetate | 5.80 |
| xylene | 6.25 |

The coatings were then cured by baking the panel at 149° C. for 30 minutes.

Two panels were prepared according to the invention. These panels were identical to the comparison panels, except that the basecoat composition was modified for one panel (Panel 1) by eliminating the dodecylbenzene sulfonic acid catalyst. For the other panel prepared according to the invention (Panel 2), the basecoat composition was modified by eliminating the dodecylbenzene sulfonic acid catalyst and replacing the fully alkylated monomeric melamine cross-linking agent with the same amount (on a solids basis) of Cymel ® 325 polymeric partially alkylated amino functional melamine cross-linking agent.

The yellowing index of each of the panels was determined according to ASTM D 1925-70. The yellowing index for the comparison panel was 15.19 whereas the yellowing index for the panels prepared according to the invention was 7.60 for Panel 1 and 6.61 for Panel 2. This indicates a significant reduction in yellowing for the panels prepared according to the invention versus the comparison panel.

The invention has been described in detail with reference to preferred embodiments thereof. It should be understood, however, that variations and modifications can be made within the spirit and scope of the invention.

What is claimed is:

1. A method of producing a coating, comprising the steps of:
    A) coating at least one layer on an article with a cross-linkable polymer coating composition that includes an aminoplast cross-linking agent, said composition being substantially free of strong acid crosslinking catalyst, B) coating at least one clearcoat layer above the layer from step A) with a coating composition comprising
   1) a polymer comprising a hydroxy functional group, and
   2) a blocked isocyanate cross-linking agent, and
C) curing the coating.

2. A method according to claim 1 wherein the crosslinkable polymer coating composition of step A) comprises an acrylic polymer that comprises hydroxy functional groups.

3. A method according to claim 1 wherein the crosslinking agent of step A) is a polymeric partially alkylated amino-functional melamine formaldehyde resin or melamine derivative formaldehyde resin.

4. A method according to claim 2 wherein the crosslinking agent of step A) is a polymeric partially alkylated amino-functional melamine formaldehyde resin or melamine derivative formaldehyde resin.

5. A method according to claim 1 wherein the coating composition of step A) contains no strong acid crosslinking catalyst.

6. A method according to claim 1 wherein the polymer of step B) comprising the hydroxy functional group is an acrylic, a polyester, an epoxy, a polycarbonate, a polyurethane, a polyamide, a polyimide, or a polysiloxane.

7. A method according to claim 1 wherein the hydroxy functional group of step B) is a primary hydroxy functional group.

8. A method according to claim 1 wherein the polymer of step B) comprising the hydroxy functional group is an acrylic.

9. A method according to claim 1 wherein the isocyanate group is blocked with an oxime group.

10. A method according to claim 1 wherein the coating composition of step B) comprises from 10 to 50 weight percent of said polymer comprising a hydroxy functional group and from 10 to 40 weight percent of said blocked isocyanate cross-linking agent.

* * * * *